(No Model.)

G. W. BOLTON.
CAR COUPLING.

No. 494,776. Patented Apr. 4, 1893.

Witnesses
A. L. Hobbie
J. M. Dougherty

Inventor
George W. Bolton
By Mr. S. Sprague Son,
Attys.

UNITED STATES PATENT OFFICE.

GEORGE W. BOLTON, OF DETROIT, MICHIGAN.

CAR-COUPLING.

SPECIFICATION forming part of Letters Patent No. 494,776, dated April 4, 1893.

Application filed July 1, 1892. Serial No. 438,664. (No model.)

*To all whom it may concern:*

Be it known that I, GEORGE W. BOLTON, a citizen of the United States, residing at Detroit, in the county of Wayne and State of Michigan, have invented certain new and useful Improvements in Car-Couplings, of which the following is a specification, reference being had therein to the accompanying drawings.

This invention relates to new and useful improvements in car-couplers, and the invention consists in the peculiar construction, arrangement and combination of the various parts, all as more fully hereinafter described.

Figure 1:
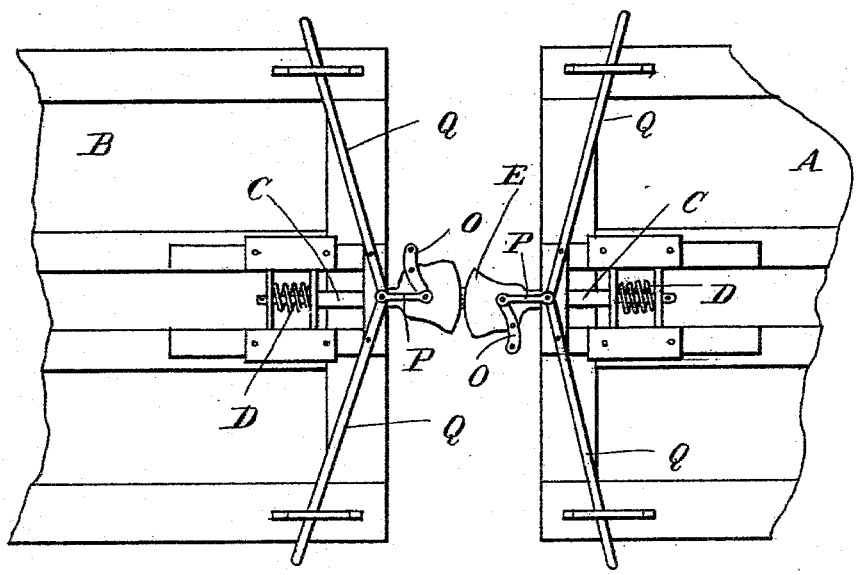
Figure 2:
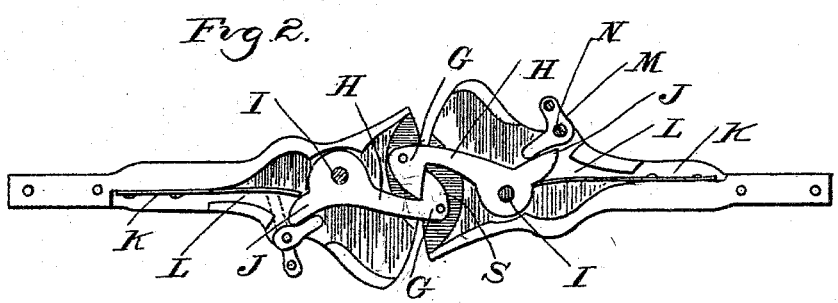
Figure 3:
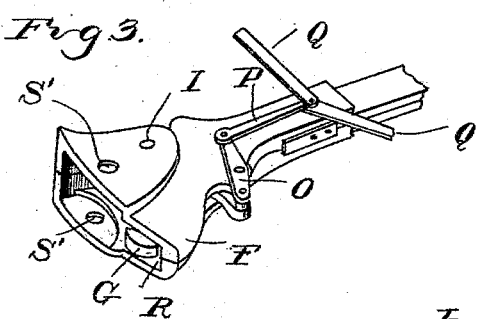

In the drawings, Figure 1 is a bottom plan view of two cars to each of which my coupler is applied and showing the parts in their coupled position. Fig. 2 is a horizontal section through the couplers. Fig. 3 is a detached perspective view of one of the coupler heads.

A and B are the two cars. As each coupler is alike a description of one will suffice for both.

C is the drawbar.

D is the usual spring to which the drawbar is applied and E is the draw-head secured to the forward end of the draw-bar and made preferably of an open bell shaped form as shown in Figs. 2 and 3, having an off-set F at one side thereof, the opening in the head being wider than the opening in the off-set, the opening in the off-set being substantially the size of the head G of the hook H, which hook is pivoted upon the pivot I, substantially in the center of the head E. The hook in rear of the pivotal point is provided with the actuating arm J which extends toward the side of the casing.

K is a spring secured in the opening L in rear of the head and bearing with its front end against the arm J acting with its tension to normally hold the hook in its coupled position.

The uncoupling device consists of a curved or bell crank lever M pivoted on the pin N at one side of the head and connected at its outer end to the lever O which is connected to the link P, to the end of which are connected the two actuating levers Q extending to each side of the car, all so arranged that upon rocking one of the levers Q toward the end of the car it will draw upon the link P and through the medium of the lever O the bell crank lever N will be rocked against the rear face of the arm J of the coupling hook rocking that hook upon its pivot and turning it into the socket R in the offset F of the head unhooking it from the other coupler. When two cars approach other, each provided with my coupler, the inclined faces S will strike together forcing the hook backward until the heads have passed each other, when the springs K will act to throw them into engagement to couple the car.

S' are apertures in the upper and lower face of the coupling head, through which a pin may be placed, so that my device may be used with an ordinary link and pin coupler. When the hook is moved into the offset it will be withdrawn within the head and entirely out of the way of the link and pin, which may be used with my coupler by moving the hook back into the off-set and locking it therein. By locking the lever Q it is not apt to be damaged from any cause.

What I claim as my invention is—

1. In a car coupler, the combination with the draw bar, an open drawhead secured thereto, a hook pivoted therein, an inclined arm at the rear of the pivoted point of the hook, a bell crank pivoted in the side of the casing adapted to bear against one side of the arm, a spring secured in the casing bearing against the other side of the arm and means for actuating the bell crank, substantially as described.

2. In a car coupler, the combination of a draw-bar, the open draw-head secured thereto, the hook pivoted therein, the off-set F at one side of the drawhead. having an opening therein, substantially the size of the head of the hook in which said hook is adapted to be rocked in its uncoupled position, the arm J on the rear of the coupler hook, the bell crank lever M pivoted in the side of the casing and the levers Q for actuating said bell crank, substantially as described.

In testimony whereof I affix my signature in presence of two witnesses.

GEORGE W. BOLTON.

Witnesses:
   JAMES WHITTEMORE,
   M. B. O'DOGHERTY.